US009818244B2

(12) United States Patent
Elfström et al.

(10) Patent No.: US 9,818,244 B2
(45) Date of Patent: *Nov. 14, 2017

(54) METHOD AND SYSTEM FOR PERMITTING REMOTE CHECK-IN AND COORDINATING ACCESS CONTROL

(71) Applicant: Assa Abloy AB, Stockholm (SE)

(72) Inventors: Jan Elfström, Landskrona (SE); Martin Kjällman, Helsingborg (SE); Arnon Alexander, Marietta, GA (US); Halvor Aase, Moss (NO)

(73) Assignee: ASSA ABLOY AB (SE)

(*) Notice: Subject to any disclaimer, the term of this patent is extended or adjusted under 35 U.S.C. 154(b) by 186 days.

This patent is subject to a terminal disclaimer.

(21) Appl. No.: 14/273,817

(22) Filed: May 9, 2014

(65) Prior Publication Data

US 2014/0247111 A1 Sep. 4, 2014

Related U.S. Application Data

(63) Continuation of application No. 12/697,044, filed on Jan. 29, 2010, now Pat. No. 8,730,004.

(51) Int. Cl.
*G05B 19/00* (2006.01)
*G05B 23/00* (2006.01)
(Continued)

(52) U.S. Cl.
CPC ......... *G07C 9/00007* (2013.01); *G06Q 10/02* (2013.01); *G07C 9/00031* (2013.01);
(Continued)

(58) Field of Classification Search
CPC ............ G07C 9/00309; G07C 9/00087; G07C 9/00103; G07C 9/00857;
(Continued)

(56) References Cited

U.S. PATENT DOCUMENTS 4,811,012 A 3/1989 Rollins
4,993,068 A * 2/1991 Piosenka ................. G06F 21/32
235/380

(Continued)

FOREIGN PATENT DOCUMENTS

EP 0416792 3/1991
JP H10-312414 11/1998
(Continued)

OTHER PUBLICATIONS

Extended Search Report for European Patent Application No. 10160101.1, dated Aug. 2, 2012, 8 pages.
(Continued)

*Primary Examiner* — Emily C Terrell
(74) *Attorney, Agent, or Firm* — Sheridan Ross P.C.

(57) ABSTRACT

Methods, systems, and devices for controlling access within a multi-facility room are provided. More specifically, a guest of the multi-room facility is allowed to remotely confirm reservations to the facility as well as bypass the front desk of the multi-room for check-in purposes. At a location within the facility, the guest is allowed to confirm their arrival, check-in, and have their access credential written with personalized access data that may be useable for the duration of the guest's stay.

9 Claims, 6 Drawing Sheets

(51) Int. Cl.

| | | |
|---|---|---|
| *G06F 7/00* | (2006.01) | |
| *G06K 19/00* | (2006.01) | |
| *G08B 29/00* | (2006.01) | |
| *G08C 19/00* | (2006.01) | |
| *H04B 1/00* | (2006.01) | |
| *H04B 3/00* | (2006.01) | |
| *H04Q 1/00* | (2006.01) | |
| *H04Q 9/00* | (2006.01) | |
| *G07C 9/00* | (2006.01) | |
| *G06Q 10/02* | (2012.01) | |

(52) U.S. Cl.
CPC ..... *G07C 9/00103* (2013.01); *G07C 9/00904* (2013.01); *G07C 9/00857* (2013.01)

(58) Field of Classification Search
CPC ...... G07C 2009/00865; G07C 2209/08; G07C 9/00015; G07C 9/00111; G07C 2209/06; G07C 9/00031; G07C 9/00119; G07C 9/00158; G06Q 20/341; H04W 12/08; E05B 2047/0067; E05B 2047/0072; E05B 65/0032; G06F 21/34; G06K 19/0723; G06K 7/0008
See application file for complete search history.

(56) References Cited

U.S. PATENT DOCUMENTS

| | | |
|---|---|---|
| 5,979,754 A | 11/1999 | Martin et al. |
| 6,101,477 A | 8/2000 | Hohle et al. |
| 6,845,361 B1 | 1/2005 | Dowling |
| 6,972,660 B1 | 12/2005 | Montgomery, Jr. et al. |
| 6,975,202 B1 | 12/2005 | Rodriguez et al. |
| 7,315,823 B2 | 1/2008 | Brondrup |
| 7,362,862 B2 | 4/2008 | Schneier et al. |
| 8,102,240 B2 | 1/2012 | Birchbauer et al. |
| 8,730,004 B2 | 5/2014 | Elfstrom et al. |
| 2002/0143588 A1 | 10/2002 | Ishigami et al. |
| 2003/0149576 A1 | 8/2003 | Sunyich |
| 2004/0093281 A1 | 5/2004 | Silverstein et al. |
| 2004/0116115 A1 | 6/2004 | Ertel |
| 2004/0117275 A1 | 6/2004 | Billera |
| 2004/0138917 A1 | 7/2004 | Fujimoto |
| 2005/0080675 A1 | 4/2005 | Lovegreen et al. |
| 2005/0168320 A1 | 8/2005 | Henderson et al. |
| 2005/0242921 A1 | 11/2005 | Zimmerman et al. |
| 2005/0264397 A1 | 12/2005 | Coelho et al. |
| 2006/0214767 A1 | 9/2006 | Carrieri |
| 2007/0096871 A1 | 5/2007 | Mason et al. |
| 2007/0176739 A1 | 8/2007 | Raheman |
| 2007/0243934 A1 | 10/2007 | Little et al. |
| 2008/0155429 A1 | 6/2008 | Frank et al. |
| 2008/0249847 A1 | 10/2008 | Dahlin |
| 2009/0066476 A1 | 3/2009 | Raheman |
| 2009/0104963 A1 | 4/2009 | Burman et al. |
| 2009/0265552 A1* | 10/2009 | Moshir ............... H04L 63/0464 713/168 |
| 2010/0031043 A1 | 2/2010 | Burger et al. |
| 2012/0022902 A1 | 1/2012 | Gressel et al. |
| 2012/0157058 A1* | 6/2012 | Lowe .................. H04L 63/062 455/411 |

FOREIGN PATENT DOCUMENTS

| | | |
|---|---|---|
| JP | 2003-008873 | 1/2003 |
| JP | 2004-0064975 | 9/2005 |
| KR | 2004-0069226 | 8/2004 |
| WO | WO 02/027623 | 4/2002 |
| WO | WO 2009/015347 | 1/2009 |

OTHER PUBLICATIONS

Official Action for U.S. Appl. No. 12/697,044, mailed Apr. 24, 2012, 23 pages.

Official Action for U.S. Appl. No. 12/697,044, mailed Sep. 26, 2012, 21 pages.

Official Action for U.S. Appl. No. 12/697,044, mailed May 30, 2013, 26 pages.

Notice of Allowance for U.S. Appl. No. 12/697,044, mailed Jan. 10, 2014, 11 pages.

* cited by examiner

METHOD AND SYSTEM FOR PERMITTING REMOTE CHECK-IN AND COORDINATING ACCESS CONTROL

CROSS-REFERENCE TO RELATED APPLICATIONS

This application is a continuation of U.S. patent application Ser. No. 12/697,044, filed Jan. 29, 2010, the entire content of which is hereby incorporated herein by reference.

FIELD OF THE INVENTION

The present invention relates generally to access control systems, methods, and devices and more particularly access control mechanisms well suited for use in multi-room facilities.

BACKGROUND

Multi-room or multi-suite facilities such as hotels, apartment buildings, office complexes, dormitories, office buildings, classrooms, cruise ships, laboratory facilities, and similar structures have many devices that, if monitored and/or controlled in a manner not currently done, will generate new functionalities in the areas of facility security, facility operational efficiency, and facility maintenance (for the facility operator and the facility user) and will generate an overall cost reduction in facility management and maintenance.

A problem often encountered while visiting a hotel as a guest is the nuisance of standing in line at the front desk, particularly during check-in. As standard hotel locks require cards to be uniquely encoded with information such as the guest stay duration, room number and other preferences such as access to common rooms, spa, and added services etc., there is usually no alternative to checking-in at the front desk for a guest to obtain a properly encoded access card.

SUMMARY

It is, therefore, one aspect of the present invention to provide a more intelligent mechanism for managing the operations of a multi-room facility. More specifically, embodiments of the present invention provide methods, systems, and devices which allow a guest or user of a multi-room facility to remotely check-in and bypass the nuisance of standing in line at the front desk.

Additionally, embodiments of the present invention provide mechanisms which allow a guest who has already remotely confirmed reservations to proceed to an access control module within the multi-room facility (i.e., an access credential reader not located at the guest services or concierge desk) and have access data automatically written to their access credential. Accordingly, a guest is not only allowed to bypass the front desk for check-in purposes, but is also capable of having their personalized facility access data written to their person of access credential by access control modules located within the multi-room facility.

In some embodiments, a method of operating a multi-room facility having a front desk with a credential programming system located in proximity therewith and a plurality of access control modules located within the multi-room facility, a first of the access control modules comprising access control logic configured to make a determination to either permit or deny user access to an asset controlled by the first access control module and a check-in module configured to perform check-in operations similar to the credential programming system, the method generally comprising:

receiving, at the first access control module, a message from an access credential, the message including a credential identifier;

extracting, by the first access control module, the credential identifier from the message;

comparing, by the first access control module, the credential identifier with credential identifiers contained within a list of credential identifiers maintained at the first access control module;

determining that the credential identifier matches at least one credential identifier in the list of credential identifiers; and based on determining that the credential identifier matches at least one credential identifier in the list of identifiers, encoding, by the first access control module, the access credential with access data that enables the access credential to verify access permissions with the plurality of access control modules within the multi-room facility.

In some embodiments a multi-room facility is provided that generally comprises:

an access control module located within the multi-room facility, the access control module comprising:
  access control logic configured to make a determination to either permit or deny user access to an asset controlled by the access control module; and
  a check-in module configured to receive a credential identifier from an access credential, compare the credential identifier to a list of credential identifiers, determine that the credential identifier matches at least one credential identifier in the list of credential identifiers, and, based on determining that the credential identifier matches at least one credential identifier in the list of identifiers, invoke the access control module to encode the access credential with access data that is useable by the access credential with other access control modules within the multi-room facility.

It is one aspect of the present invention to allow a user to leverage their existing credential (e.g., mobile phone, drivers license, passport, frequent flyer card, hotel loyalty card, etc.) as an access credential for one or more different facilities (e.g., hotels, airlines, etc.). In other words, access data can be written to the user's credential as long as that credential provides a credential identification number that is recognized by an access control module. This provides users and hospitality companies with the ability to greatly reduce the frustration and time associated with check-in procedures.

The Summary is neither intended nor should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

DETAILED DESCRIPTION

The invention will be illustrated below in conjunction with an exemplary access control system. Although well suited for use with, e.g., a system using access control readers and/or credentials, the invention is not limited to use with any particular type of access control system or configuration of system elements. Those skilled in the art will recognize that the disclosed techniques may be used in any data messaging application in which it is desirable to increase the efficiency or desirability of an access process whether such process includes adding, terminating or altering access privileges.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Although various embodiments of the present invention will be described below in connection with updating access data on an access credential and in particular access data used within a multi-room facility, one skilled in the art will appreciate that embodiments of the present invention are generally applicable to updating any type of data on a portable identification device or portable memory. Thus, the mechanisms and methods discussed in connection with performing an access data update or encoding process can be applied to updating or encoding any other type of data (e.g., configuration data, security data, keys, etc.) in a similar manner without departing from the scope of the present invention.

Figure 1:
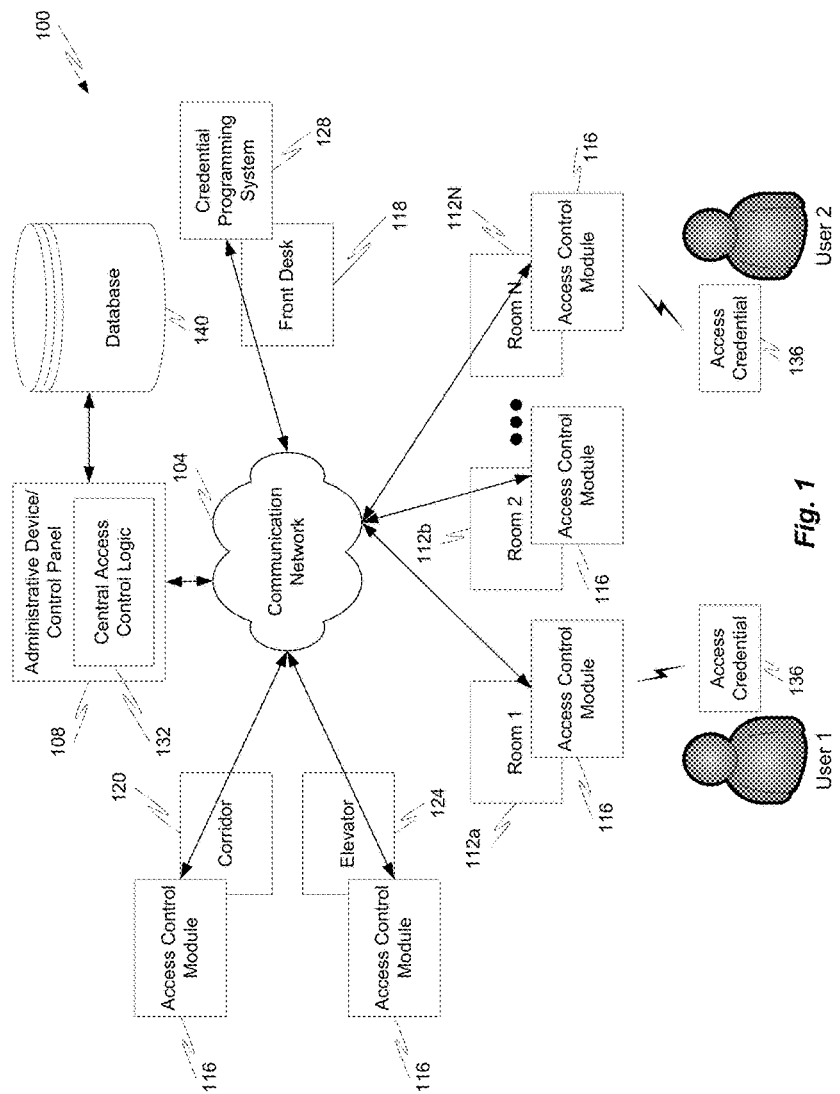
FIG. 1 is a block diagram depicting a multi-room facility in accordance with embodiments of the present invention.

Referring initially to FIG. 1, an exemplary access control system 100 is depicted in accordance with at least some embodiments of the present invention. The access control system 100 may include a communication network 104 connecting a plurality of access control modules 116 and a credential programming system 128 to an administrative device 108, which may also be referred to as a control panel.

The administrative device 108 may include access control logic 132 that is generally responsible for administering the secure access system 100 of the multi-room facility. In other words, the access control logic 132 of the administrative device 108 may provide a central location for administering the security of the multi-room facility. For example, the access control logic 132 may be connected to a centralized database 140 which includes guest reservation information (e.g., guest preferences, stay duration, customer preferences, guest contact information, and any other information that confirms a guest's reservations to one or more rooms 112a-N within or assets of the multi-room facility). The access control logic 132 may serve as a central source of security information for the various other components of the secure access system 100.

The access control logic 132 may be adapted to respond to requests generated by the access control modules 116 and credential programming system 128 (e.g., by providing requested information to the requesting device or confirming the accuracy of information provided by the requesting device). Alternatively, or in addition, the access control logic 132 may be adapted to provide instructions to the access control modules 116 and credential programming system 128, thereby allowing these devices to administer some or all of the secure access system 100 without requiring such devices to communicate with the access control logic 132 during every transaction.

The credential programming system 128 is typically located at a front desk 118 or some other centralized and secure location of the multi-room facility since the credential programming system 128 is usually provided with the capabilities of writing access data to access credentials during guest check-in. Thus, it is generally preferred by owners and operators of the multi-room facility to maintain a certain level of security over the credential programming system 128 since it has the capability of writing access data to credentials which could potentially allow a holder of the credential to access any asset within the multi-room facility. Without some level of control over the credential programming system 128, there could be an increased risk that guests would write access data to their credentials that exceeds the access permissions which would otherwise be provided to the guest. For this reason almost all current multi-room facilities require a guest to check-in at the front desk 118 so that the guest can obtain an access credential that has access data properly and accurately written thereto.

The access control modules 116, on the other hand, are usually provided to secure various assets within the multi-room facility. For example, access control modules 116 may be provided at access points to various physical assets (e.g., rooms 112a-N, corridors 120, elevators 124, safes within rooms, the multi-room facility itself, etc.). Access control modules 116 may also be provided to secure logical assets such as money accounts, customer accounts at a restaurant within the multi-room facility, or computer accounts. For instance, a restaurant within the multi-room facility may allow guests of the multi-room facility to "pay" for meals by putting the balance due on a tab associated with the room. Upon check-out it is assumed that the guest will settle all accounts and pay the balance due for the room and such meals. Accordingly, some restaurants may provide an access control module 116 to secure such accounts and ensure that guests associate their balance with the appropriate room.

Of course, the access control modules 116 may comprise additional functionality and such additional functionality will be dependent upon the types of credentials 136 used, the communication network 104, the type and/or physical nature of the facility (multiple buildings—geographically separated), the nature of the business (hotel or business) and other design considerations. In accordance with at least one embodiment of the present invention, an instruction set (e.g., firmware, software, configuration data, and/or security data) is resident on the access control module 116 to support and control the functions of the access control module 116.

To facilitate such security policies, the access control modules 116 may be adapted to communicate with access credentials 136 carried by users or guests of the multi-room facility via contactless and/or contact-based communication protocols. Such communications will allow the access control modules 116 to identify the access credential 136 presented thereto as well as determine access permissions for the holder of the access credential 136.

Examples of the communication protocols employed by an access control module 116 to communicate with an access credential 136 include, without limitation, RF-based communications (e.g., ISO 14443A, ISO 14443B, ISO 15693, Near Field Communications, Bluetooth, Zigbee, WiFi, and any other type of communication protocol that utilizes an RF field at 125 kHz or 13.56 MHz, for example), magnetic-based communications, light-based communications, wire-based communications including ISO 7816, I$^2$C, SPI, as well as other known or yet to be developed communication protocols.

In some embodiments, the access control modules 116 include RF reading and writing (encoding) capabilities. Such access control modules 116 may be referred to as readers/writers. Access control modules 116 with reading and writing capabilities generally include an RF antenna for exchanging RF messages with access credentials 136 during read operations and a separate RF antenna for transmitting RF messages which encode access credentials 136 during write operations. However, one skilled in the art will appreciate that an access control module 116 may comprise a single antenna that is used during both read and write operations.

In accordance with at least some embodiments of the present invention, the communication network 104 is adapted to carry messages between the components connected thereto. Thus, the administrative device 108 is allowed to send messages to and receive messages from an access control module 116 and/or credential programming system 128 via the communication network 104. The communication network 104 may comprise any type of known communication network including wired and wireless or combinations of communication networks and may span long or small distances. The protocols used by the communication network 104 to facilitate controller 116/access control module 116 communications may include, but is not limited to, the TCP/IP protocol, Simple Network Management Protocol (SNMP), Power of Ethernet (POE), Wiegand Protocol, RS 232, RS 485, Current Loop, Bluetooth, Zigbee, GSM, SMS, WiFi, and combinations thereof.

Figure 2:
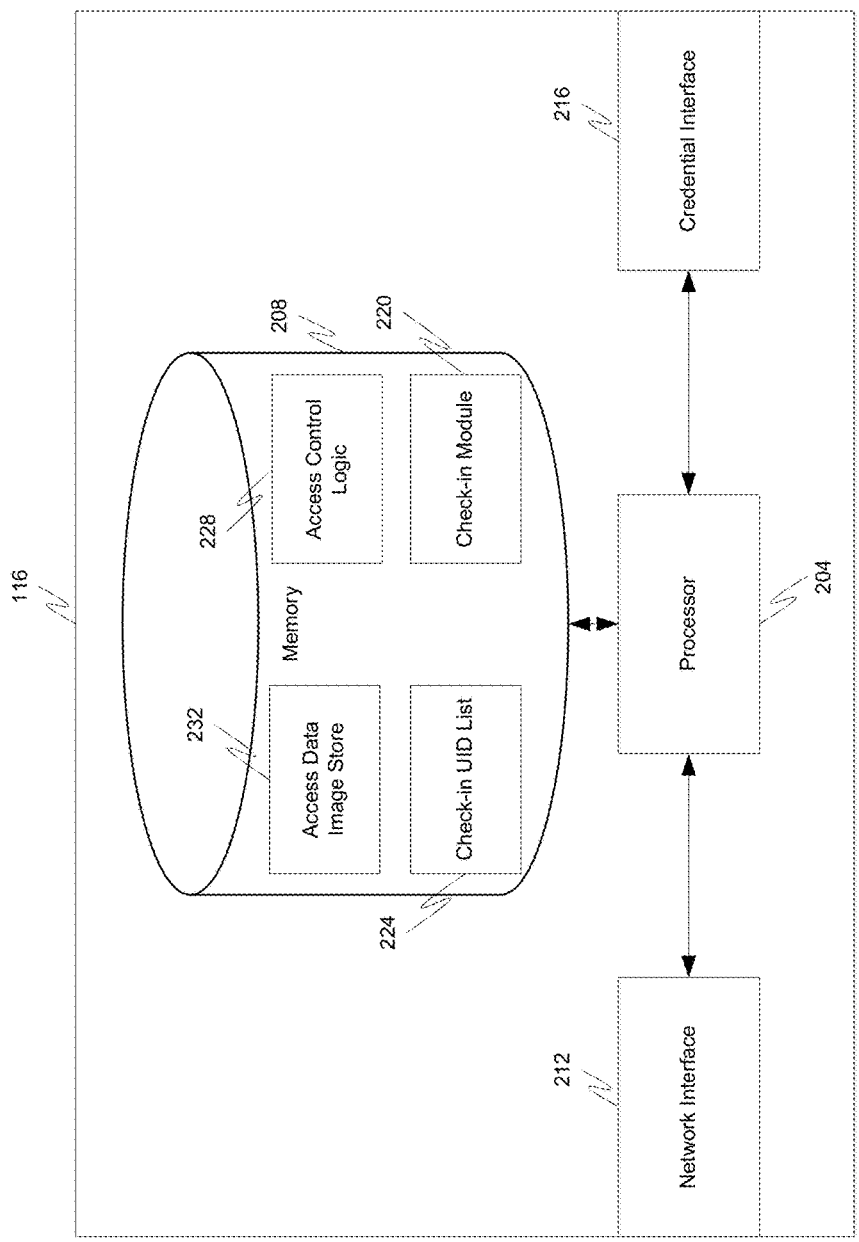
FIG. 2 is a block diagram depicting an access control module in accordance with embodiments of the present invention.

With reference now to FIG. 2, details of an exemplary access control module 116 will be described in accordance with at least some embodiments of the present invention. The access control module 116 generally comprises the capability to automatically read data, typically in the form of a message object and/or validation information, from a credential 136. The access control module 116 may also be capable of writing data, typically in the form of a message object, back to the credential 136. This process is also known as encoding the credential 136. In some embodiments, the access control module 116 may be configured to first read a card identifier from a credential 136 and then encode the credential 136 with access data during the same transaction.

The access control module 116, in accordance with at least one embodiment, comprises a credential communication interface 216 used to communicate back and forth with the credential 136. The credential communication interface 216 may comprise an RF communication interface (e.g., an RF antenna), a magnetic communication interface (e.g., a magnetic stripe reader), an optical communication interface (e.g., an infrared detector and transmitter), an electrical contact communication interface, or any other means of communicating information to/from a credential 136.

Connected to the communication interface 216 is a controller or processor 204. In one embodiment, the processor 204 includes a microprocessor, a random number generator, and a cryptographic coprocessor. The processor 204 is capable of properly modulating/demodulating data sent to and received from external devices such as the credential 136. The processor 204 controls and determines how the access control module 116 behaves when a credential 136 is presented to it. The processor 204 may include any general-purpose programmable processor, digital signal processor (DSP) or controller for executing application programming. Alternatively, the processor 204 may comprise a specially configured Application Specific Integrated Circuit (ASIC).

The processor 204 may also be provided with control circuitry capable of manipulating an access control device. The access control device is designed to secure a point of access being protected by the access control module 116. The processor 204 is enabled to communicate with the access control device via a network interface 212 or via some other dedicated access control interface. Examples of a typical access control device include, without limitation, an electronic lock, a magnetic lock, or an electric strike for a door, a lock for a computer system, a lock for a database, a lock on a financial account, or a lock on a computer application. In one embodiment, the processor 204 actuates the access control device by sending a signal to the access control device via the network interface 212 based on results of an access decision made by the processor 204. Optionally, the access control device may be integral to the access control module 116 in one embodiment, in which case an access control device interface would not be necessary. In an alternative embodiment, an access control device is external to the access control module 116, thus necessitating some sort of interface between the access control module 116 and access control device. Examples of an access control device interface include any type of data port such as a USB port, serial data port, parallel data port, a convention wire, a wireless communication port such as a Bluetooth data interface, an Ethernet port, or any other type of wired or wireless communication interface.

The network interface 212 is also used to connect the access control module 116 to the communication network 104. Accordingly, communication packets or messages sent by the access control module 116 are received initially by the access control module 116 at the network interface 212. These messages may be forwarded to the processor 204 for further analysis and processing (e.g., decoding, re-formatting, and/or data extraction). The network interface 212 provides communication capabilities between the access control module 116 and external servers or other network nodes. Such a communication interface may include a USB port, a wired modem, a wireless modem, a network adapter such as an Ethernet card and Ethernet port, a serial data port, a parallel data port, or any other communication adapter or port known in the art. Of course, the network interface 212 may actually be embodied as multiple network interfaces, for facilitating communications with multiple network types, possibly via different communication protocols.

The access control module 116 may further comprise a memory 208. The memory 208 may be used to store firmware or software instructions that supports functionality of the access control module 116. More specifically, the memory 208 may comprise one or more modules that provide the access control module 116 with the ability to make a determination to either permit or deny user access to an asset controlled by the access control module as well as execute check-in functions normally reserved for the credential programming system.

In some embodiments the memory 208 includes a check-in module 220 and access control logic 228. The access control logic 228 provides the access control module 116 with the ability to read access data from credentials 136 and make a determination as to whether or not the holder of the credential 136 is allowed to access any assets controlled by the access control module 116. Thus, the access control logic 228 may facilitate access data reading operations, access data verification operations, and operations associated with permitting user access to an asset (e.g., unlocking a door, providing access to an account, etc.).

In some embodiments, the check-in module 220 is provided to perform check-in procedures that has traditionally been reserved to the credential programming system 128. In particular, the check-in module 220 may be configured to receive a credential identifier from an access credential 136, compare the credential identifier to a list of credential identifiers, determine that the credential identifier matches at least one credential identifier in the list of credential identifiers, and, based on determining that the credential identifier matches at least one credential identifier in the list of identifiers, invoke the access control module to encode the access credential with access data that is useable by the access credential with other access control modules within the multi-room facility.

As can be appreciated by those skilled in the art, functions and features of the access control logic 228 can be incorporated in the check-in module 220 and vice-versa. There is no requirement that two separate and distinct modules be provided for the access control functions and the check-in functions. Rather a single module may be configured to provide all of the functionality described herein. Also, it is possible that various features of the access control logic 228 and check-in module 220 may be performed by other modules of memory 208 without departing from the scope of the present invention.

It should be appreciated that to complete a read/verify/encode operation, such as the one described above in connection with the check-in module 220, it is important to limit the amount of time that a credential 136 has to be presented to the access control module 116. For example, a typical user will generally not tolerate presenting a credential to an access control module 116 for more than five seconds, or so. Accordingly, the access control module 116 is enabled to read an identification number from the credential 136, confirm that the identification number from the credential 136 matches an identification number associated with a guest that has confirmed reservations and is allowed to check-in at a location other than the front desk 118, and encode the credential 136 with the appropriate access data in a minimal amount of time.

Embodiments of the present invention provide the access control module 116 with a locally maintained check-in Unique Identification (UID) number list 224 and a local access data image store 232 to enable the access control module 116 to complete the read/verify/encode operation in a minimal amount of time. Thus, when performing check-in functions (e.g., verification of credential identification number and encoding of credential 136 with access data), the check-in module 220 is capable of referencing the locally maintained check-in UID list 224 and causing the appropriate access data from the access data image store 232 to be encoded on the credential 136. This data may be kept persistently on the credential 136 or renewed automatically after a pre-determined amount of time.

In accordance with at least some embodiments of the present invention, the data stored in the check-in UID list 224 is maintained in a relatively simple but easily searchable format. For example, the list may simply be a list of identification numbers associated with a card that has been authorized to check-in at a location other than the front desk 118. In some embodiments, numbers are added to the list 224 upon receiving a message from the central access control logic 132 which includes a credential identification number, the check-in module 220 updates the list 224 to include the newly received credential identification number. Conversely, when the check-in module 220 has completed a check-in process for a credential 136 and confirmed that the check-in has been successful, the check-in module 220 can remove the corresponding credential identification number from the list 224 (or remove it from the list after check-out, should there be problems during the stay).

The access data image store 232 may contain one or more access data images that are capable of being written to a credential 136. In some embodiments, the access data contained within the access data image store 232 is formatted specifically for the multi-room facility (i.e., in a format recognized and used by other access control modules 116 within the access control system 100) and may not necessarily be formatted for use by other facilities, even if such facilities have similar access control modules 116. This allows facility system codes and protocols to be used in a distributed fashion without having to use facility keys and while allowing the use of a guest's credential (i.e., a credential not owned by the facility).

In accordance with at least some embodiments of the present invention, the access data may include one or more of a site-code identifying the multi-room facility, an encryption key used substantially exclusively by the multi-room facility, a communication protocol used by access control modules within the multi-room facility, a guest identifier substantially uniquely identifying a user of the access credential within the multi-room facility, guest stay duration, room number, identifiers of added services, and a set of access permissions defining whether a user of the access credential is permitted or denied access to particular assets of the multi-room facility. Some or all of the data from the access data image store 232 may be written to a credential 136, depending upon the user of the credential 136 and the reservations associated with the user of the credential 136.

The memory 208 may comprise volatile and/or non-volatile memory. Examples of non-volatile memory include Read Only Memory (ROM), Erasable Programmable ROM (EPROM), Electronically Erasable PROM (EEPROM), Flash memory, and the like. Examples of volatile memory include Random Access Memory (RAM), Dynamic RAM (DRAM), Static RAM (SRAM), or buffer memory. In one embodiment, the memory 208 and the processor 204 are designed to utilize known security features to prevent unauthorized access to the contents of the memory 208 such as side channel analysis and the like.

A power source (not depicted) may also be included in the access control module 116 to provide power to the various devices contained within the access control module 116. The power source may comprise internal batteries and/or an AC-DC converter such as a switch mode power supply or voltage regulator connected to an external AC power source.

Figure 3:
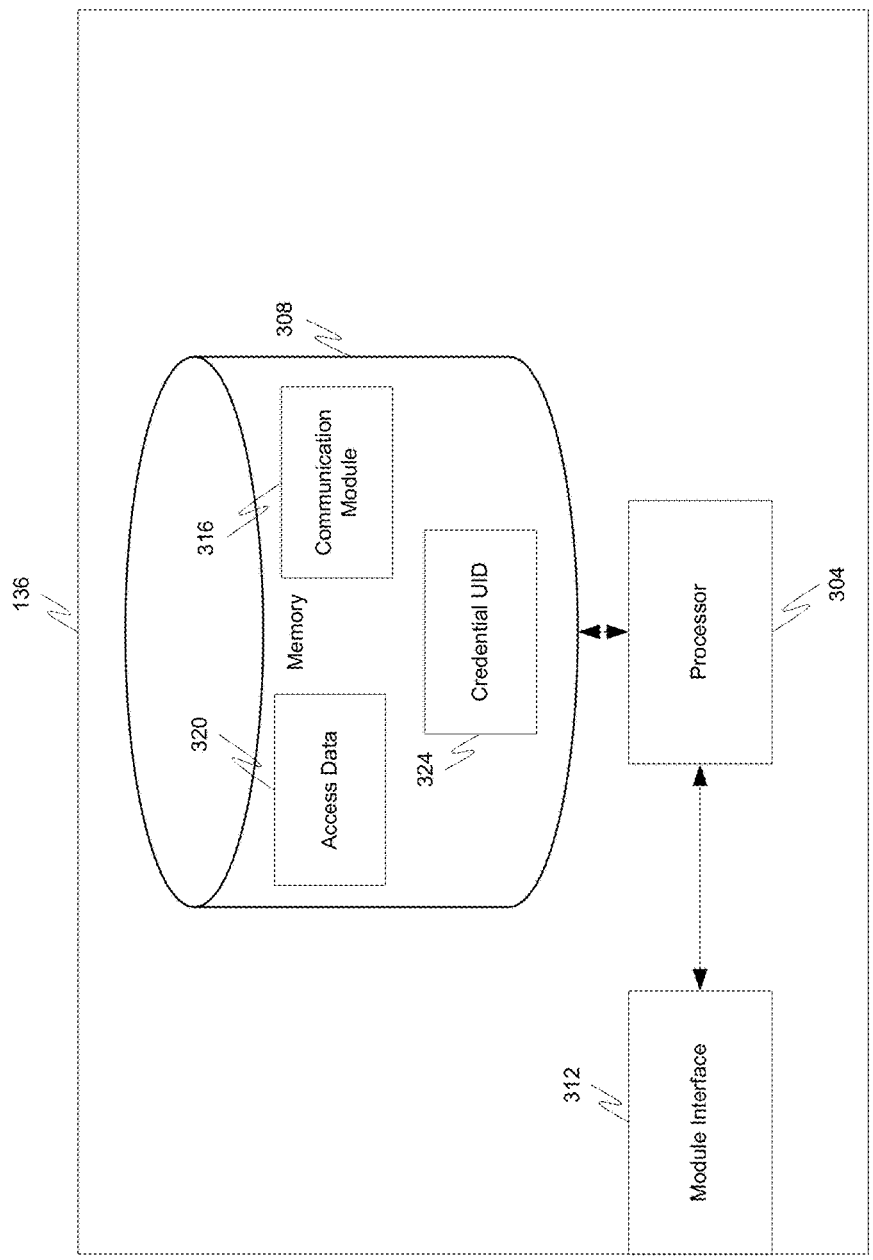
FIG. 3 is a block diagram depicting an access credential in accordance with embodiments of the present invention.

With reference now to FIG. 3, an exemplary access credential 136 will be described in accordance with at least some embodiments of the present invention. In some embodiments, the credential 136 is provided with a processor 304, memory 308, and module interface 312. The processor 304 may include a microprocessor, a programmable controller or any other type of processing unit capable of executing the instructions stored in memory 308. Alternatively, or in addition, the processor 304 may be embodied as an Application Specific Integrated Circuit (ASIC).

The processor 304 employs bi-directional interfaces to communicate with the memory 308 and module interface 312. In particular, the processor 304 facilitates data exchanges between the credential 136 and an access control module 116. Such communications are handled at the physical level by the module interface 312. Similar to the credential interface 216, the module interface 312 may comprise an RF communication interface (e.g., an RF antenna), a magnetic communication interface (e.g., a magnetic stripe reader), an optical communication interface (e.g., an infrared detector and transmitter), an electrical contact communication interface, or any other means of communicating information to/from an access control module 116. As can be appreciated by one skilled in the art, the interface 312 may include a Modulation/Demodulation Unit instead of relying upon the processor 304 to perform encoding/decoding operations, message formatting functions, and the like.

The credential 136 may be fabricated as a system-on-chip (SoC) device, a system-in-package (SiP) device, or a system-in-module (SiM) device. In the SoC device, various functional components are integrated onto a single die. Accordingly, in SiP and SiM devices, several SoC devices are combined in a single package (SiP device) or an assembly including SoC and/or SiP devices (SiM device), respectively.

A "passive" credential 136 uses RF signals (i.e., RF radiation) emitted by the access control module 116 as a source of energy for powering the credential 136 and its components (primarily the processor 304). When a passive credential 136 comes within range of an interrogating access control module 116, the access control module 116 provides power to the credential 136 via a querying RF signal. The passive credential 136 converts a portion of RF power collected by the module interface 312 (e.g., an antenna within the interface 312) into DC power facilitating operability of the credential 136. Such a credential 136 can operate only in the active zone of an interrogating access control module 116 and is inactive otherwise.

Alternatively, the credential 136 may comprise an internal (i.e., on-board) power source, e.g., one or several batteries and/or solar cells ("active" credential). In yet another embodiment, the credential 136 comprises both an RF rectifier and internal power source ("semi-active" RFID). Active and semi-active RFIDs can typically be used at greater distances from the access control modules 116 than the passive ones, as well may be provided with additional computing and/or sensing capabilities.

In operation, the access control module 116 and credential 136 use pre-programmed communication protocols. To increase probability of error-free reception, the same messages may redundantly be repeated a pre-determined number of times or during a pre-determined time interval. The protocols and nuances thereof may be defined within the access data 320 that is encoded on the credential 136. In some embodiments, portions of this access data 320 are programmed into the credential 136 prior to a guest checking-in at the multi-room facility and other portions of the access data 320 are encoded onto the credential 136 during the check-in process. For example, the communication protocol information may be pre-programmed data whereas room number, stay duration, and other data used to determine access privileges is only programmed during the check-in process. This restriction and separation of access data programming allows the multi-room facility to maintain a certain level of control over the access control system 100.

The communication module 316 may facilitate communications between the credential 136 and access control module 116. In some embodiments, the communication module 316 refers to the access data 320 to ensure that the appropriate communication protocol is used by the credential 136 in communicating with the access control module 116. In some embodiments, if the credential 136 has only been programmed with the minimal amount of access data 320, or has no access data 320 at all (e.g., the user of the credential 136 has not checked-in with the multi-room facility), the communication module 316 is capable of providing a credential UID 324 to an access control module 116 when the credential 136 is interrogated by an access control module 116. The credential UID 324 may comprise any type of identification number, name, symbol, etc. that uniquely or quasi-uniquely identifies the credential 136 or a holder of the credential 136 to the access control module 116. This credential UID 324 may be programmed into the credential 136 upon provisioning and may be secured in a read-only portion of memory 308 to ensure that it is not altered or tampered.

Accordingly, the memory 308 may be similar to the memory 208 of the access control module 116 in that the memory 308 may include one or more of ROM, EPROM, EEPROM, Flash memory, and the like.

As can be appreciated by those skilled in the art, the access credential 136 may be provided in any type of form factor without departing from the scope of the present invention. In some embodiments, the access credential may comprise an RFID card or device having similar functionality like a mobile phone, PDA, ebook reader, portable music player, or the like. In other embodiments, the access credential 136 may comprise a mag-stripe card. In still other embodiments, the access credential 136 may comprise a keyfob. Other form factors known to those of skill in the art will also become readily apparent after reviewing the current disclosure.

Figure 4:
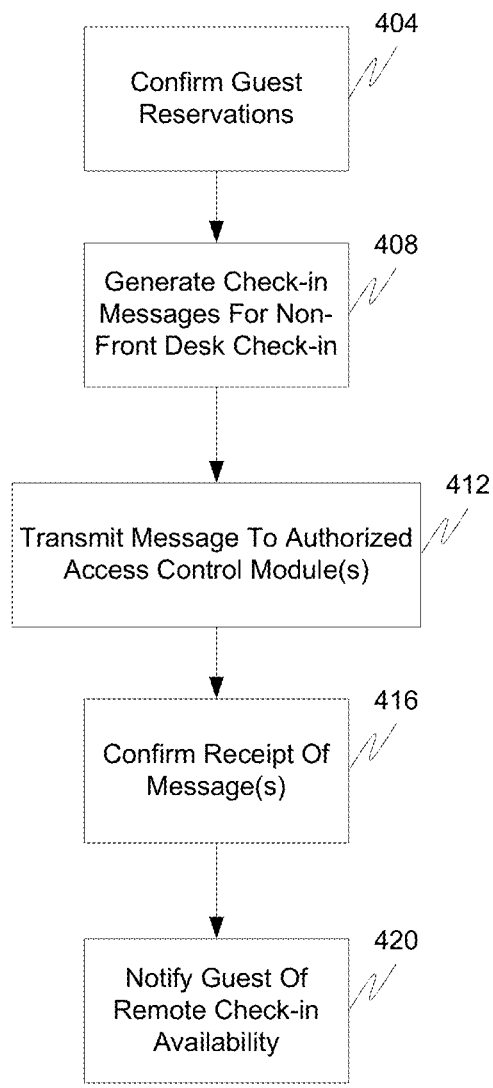
FIG. 4 is a flow diagram depicting a reservation confirmation method in accordance with embodiments of the present invention.

Referring now to FIG. 4, an exemplary method of confirming guest reservations will be described in accordance with at least some embodiments of the present invention. Initially, guest reservations for one or more assets (e.g., rooms 112a-N, services, and the like) in the multi-room facility are confirmed at the central access control logic 132. This reservation information may be maintained in the database 140 and may be retrieved by the access control logic 132 or may have been written to the database 140 by the access control logic 132.

Upon confirming guest reservations, the method continues with the access control logic generating one or more messages for non-front desk 118 check-in (step 408). In some embodiments, this feature (i.e., non-front desk check-in) may be a service which the guest pays an additional charge for. In other embodiments, only preferred customer (i.e., customers with loyalty accounts and/or cards) are allowed to access this feature. In other embodiments, this feature may be made available to all guests of the multi-room facility. Accordingly, the determination as to whether or not such a message is generated by the access control logic 132 will depend upon the operating preferences of the multi-room facility operator and does not necessarily alter the scope of the present invention.

Once generated, the access control logic 132 causes the message(s) to be transmitted to one or more authorized access control modules 116 within the secure access system 100 (step 412). In some embodiments messages are transmitted to all access control modules 116 within the secure access system 100. In other embodiments, messages are only transmitted to access control modules 116 having a check-in module 220. In other embodiments, only a subset of access control modules 116 having a check-in module 220 receive a message enabling non-front desk check-in.

For example, if a guest has confirmed reservations and a particular room has been identified as being reserved for that guest (say room 678), then only the access control module 116 associated with room 678 may be provided with the message enabling non-front desk check-in. In this particular scenario, the guest may be notified of the room identifier (i.e., room 678) and instructions for reaching room 678 upon arriving, or prior to arrival, at the multi-room facility. These instructions may be provided electronically to the guest (e.g., via SMS text, email, voicemail, or the like) or through traditional mail. Upon arriving at the multi-room facility the guest is allowed to go directly to room 678 and complete the check-in process since the access control module 116 associated with room 678 has received the message permitting non-front desk check-in.

In the above scenario, it may also be possible to provide the credential identification number to one or more access control modules 116 between the entry of the multi-room facility and room 678 to allow the guest to continue through the multi-room facility to room 678. For example, if an elevator 124 or corridor 120 must be traversed to arrive at room 678, an access control module 116 associated with such elevator 124 or corridor 120 may be provided with the credential identification number. However, these access control modules 116 may not necessarily comprise a check-in module 220 like the access control module 116 associated with room 678. If this is the case, the access control modules 116 associated with the elevator 124 or corridor 120 may permit access to their associated asset if the credential identification number is provided to the access control module 116, but these modules may not necessarily complete the check-in process. If, however, one or more of these access control modules 116 does comprise a check-in module 220, then the check-in process can be completed prior to the guest arriving at room 678.

Returning to the flow diagram of FIG. 4, once the enabling messages have been transmitted to the appropriate access control modules 116, the access control logic 132 confirms safe receipt of the message(s) (step 416). This is generally done by requiring the access control module 116 to transmit a receipt message to the access control logic 132. In the absence of receiving a receipt from the access control module 116, the access control logic 132 will generally not confirm receipt of such messages. Alternatively, a physical card can be carried by administrative personnel to the desired access control modules 116 and this physical card, when read by the access control module 116, may cause the access control module 116 to write additional credential identification numbers to its locally maintained list 224. Thus, the non-front desk check-in process can be enabled either automatically or manually depending upon security concerns of the multi-room facility.

After the message receipt has been confirmed, the access control logic 132 may cause one or more messages (e.g., electronic and/or physical) to be transmitted to the guest to notify the guest of the check-in availability as well as providing the guest with instructions for checking-in at locations other than the front desk 118 (step 420).

Figure 5:
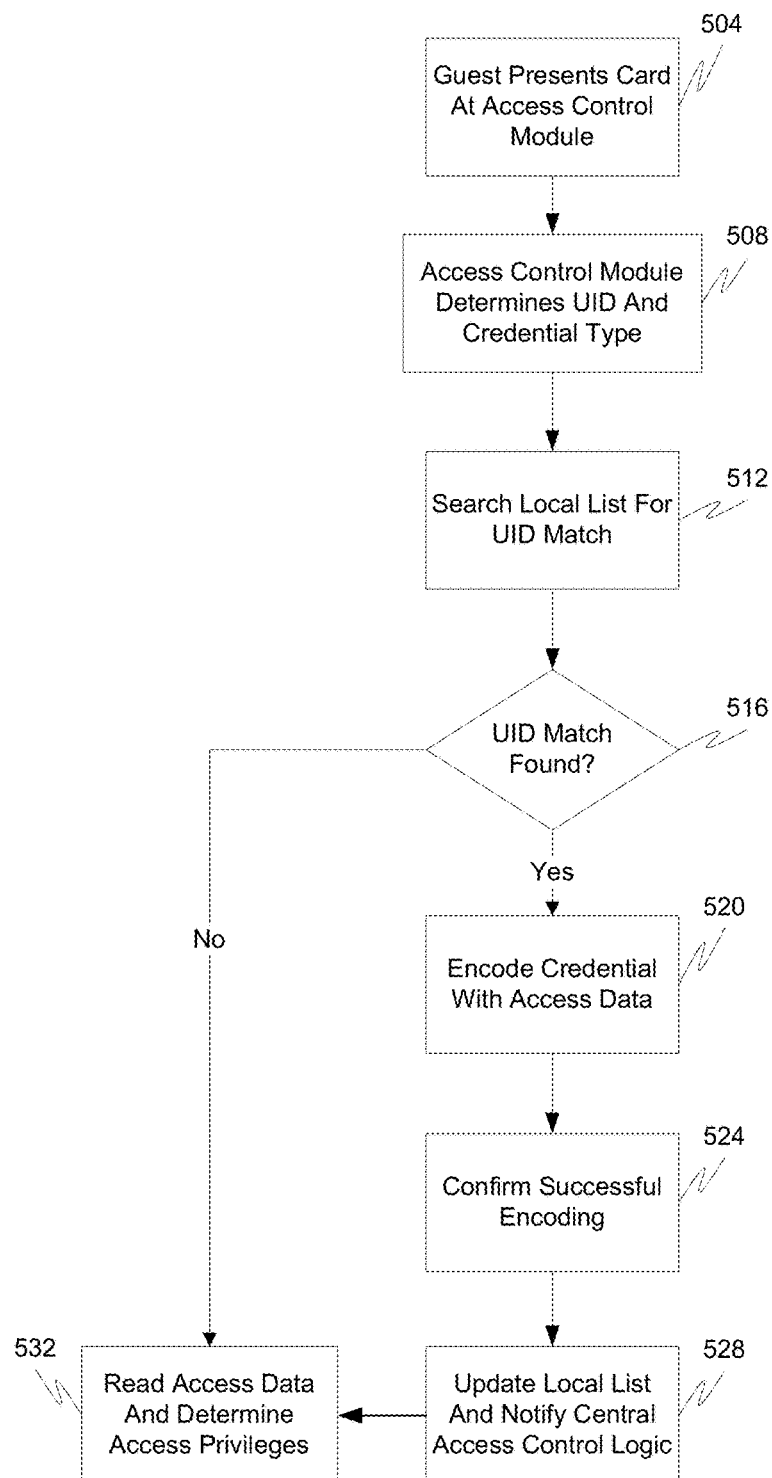
FIG. 5 is a flow diagram depicting a guest check-in method in accordance with embodiments of the present invention.

With reference now to FIG. 5, an exemplary check-in method will be described in accordance with at least some embodiments of the present invention. The method is initiated when a guest presents an access credential 136, such as an RFID card, at an access control module 116 enabled with a check-in module 220 (step 504). The method continues with the access control module 116 invoking the check-in module 220 to determine a credential identification number 324 that has been provided from the credential 136 to the access control module 116 during the initial message exchange (step 508). The check-in module 220 may also be adapted to determine a credential type as an additional data point in confirming the identity of the credential 136.

Once the credential identification number, and possibly credential type information, has been obtained the check-in module 220 searches the locally maintained check-in UID list 224 (step 512). The check-in module 220 compares the credential identification number and/or credential type information to the information maintained in the list 224 searching for matches (step 516).

If no match is found between the information provided by the credential 136 and information maintained in the list 224, then the access control module 116 continues immediately by requesting access data, if such data has not already been obtained from the credential 136, and determining access privileges for the credential 136 (or more specifically a holder of the credential 136) based on the received access data (step 532). Based on this step, the access control module 116 will make a determination as to whether or not the holder of the credential 136 is permitted to access any assets controlled by the access control module 116. If permissions are confirmed, then the access control module 116 will release or otherwise make available such assets to the holder of the credential 136. If permission are not confirmed, then the access control module 116 may either do nothing or provide a failed access attempt message to the holder of the access credential 136 (e.g., by beeping, flashing, or providing some other indicia that can be perceived by the holder).

Referring back to step 516, if a match is found between the information provided by the credential 136 and the information maintained in the list 224, the check-in module 220 continues by causing the access control module 116 to encode the credential 136 with appropriate access data (step 520). In some embodiments, the type of access data encoded on the credential 136 may be specific to the holder of the credential 136 and even more specific to the holder's reservations. For example, the access data encoded on the credential 136 may include a room number (identifying a room to which the guest has confirmed reservations), services available (identifying services to which the guest is allowed access and whether such services are complimentary, prepaid, or billable to the guest's account), and stay duration (identifying either a departure date or an expiration date for the access data).

After the access data has been encoded on the credential 136, the access control module 116 confirms the accuracy of the access data by requesting that the credential 136 provide the access data back to the access control module 116 (step 524). If the access data received from the credential 136 matches the data that was supposed to be written by the access control module 116, then the access control module 116 confirms successful encoding.

Thereafter, the check-in module 220 updates the locally maintained list 224 to reflect that the guest has checked-in (step 528). This update step may include removing the matching data from the list 224 (e.g., removing the credential identification number and/or credential type information from the list 224), thereby ensuring that the access control module 116 does not attempt to perform the check-in process on the same credential 136 or on another credential 136 for the same person. Also during this step, the access control module 116 may generate and transmit a message to the access control logic 132 indicating that it has recently completed a check-in process. This message may include the credential identification number which was checked-in and any other data necessary to confirm check-in (e.g., check-in time, location, etc.).

Upon receiving the message, the access control logic 132 may generate and send messages to other access control modules 116 within the secure access system 110 requesting that those modules 116 update their internally maintained lists 224 to reflect the recent check-in. For example, the access control logic 132 may notify any access control module 116 that was provided a message in step 412. Upon receiving such a message, the access control modules 116 which did not perform the check-in procedure can update their internally maintained lists 224 by removing the appropriate credential identification number and/or credential type information. At this point, all access control modules 116 will confirm access privileges for the recently checked-in credential 136 based on the access data 320 maintained on the credential 136 and not necessarily the credential identification number 324.

Figure 6:
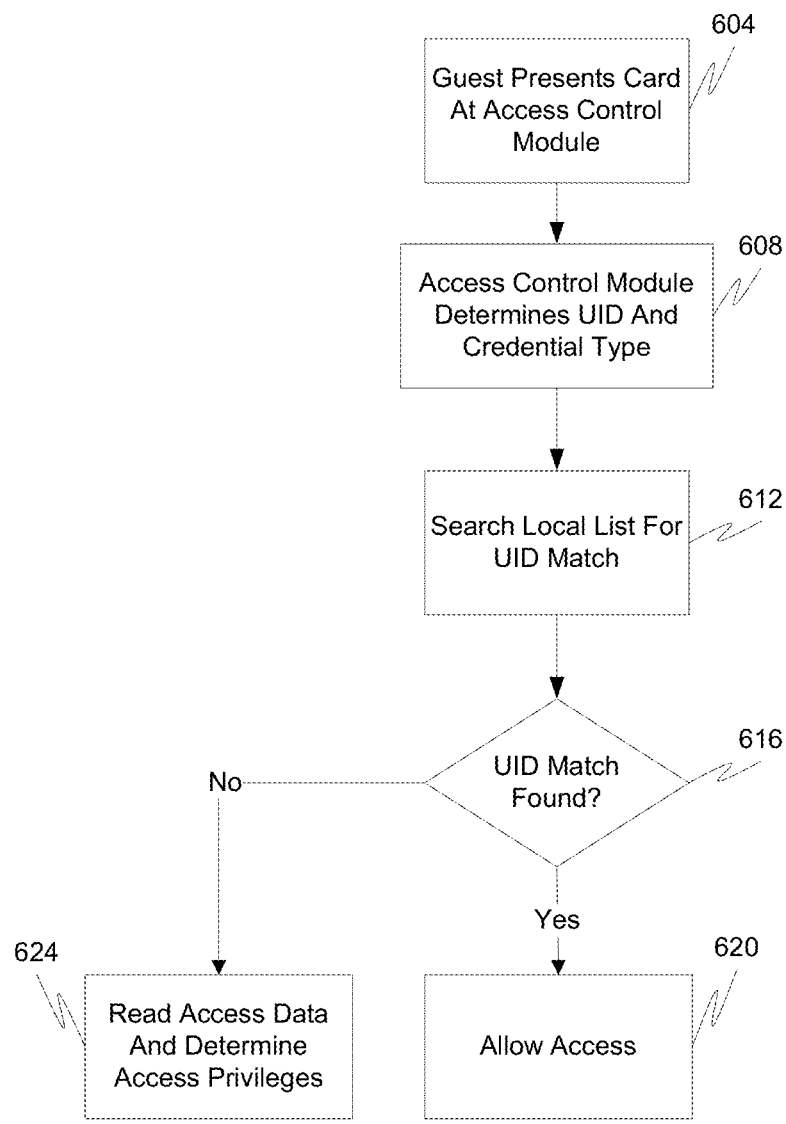
FIG. 6 is a flow diagram depicting an access control method in accordance with embodiments of the present invention.

Referring now to FIG. 6, an access control method will be described in accordance with at least some embodiments of the present invention. The method is initiated when a guest presents a credential 136 to an access control module 116 that does not have a check-in module 220 and/or permissions to confirm check-in for the credential presented thereto (step 604). For instance, the access control module 116 may be associated with a corridor 120, elevator 124, or the like. The presentation of the credential 136 to the access control module 116 causes the credential 136 to transmit one or more messages to the access control module 116 which includes its credential identification number 324 and any other pertinent identification information (e.g., credential type).

The access control module 116 parses the message(s) received from the credential 136 and determines the credential identification number 324 along with any other credential identification information (step 608). This information is compared to the locally maintained list of identification numbers 224 to help the access control module 116 determine whether the credential 136 is allowed access to the asset associated with said module (steps 612 and 616). If a match of information is found in the locally maintained list 224, the access control module 116 allows the holder of the credential 136 to access the asset secured by the access control module (step 620). If not match is found, then the access control module 116 continues by reading access data from the credential 136, if such data has not already been previously obtained during other transactions, and determining access privileges for the credential 136 based on such access data (step 624). Accordingly, the access control module 116 is capable of making access permission decisions based either on credential identification information 324 or, in the absence of confirming permissions with such data, based on access data 320. Failure of the credential 136 to provide either valid credential identification information or access data will result in the access control module 136 maintaining its asset under secure conditions. The above-described method also allows a guest to continue through certain paths, perhaps defined paths, within the multi-room facility prior to checking-in, thereby allowing the guest to possibly complete the check-in process at locations other than the front desk 118.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An access control module, comprising:
a network interface to a network;
a logic unit configured to make a determination to either permit or deny user access to an asset controlled by a networked access control module;
the logic unit configured to access via the network, a list of credential identifiers that identifies credentials allowed to perform remote check-in and store the list of credential identifiers as a locally-maintained list of credential identifiers; and
a provisioning module configured to perform the following functions during a single transaction with an access credential without requiring the access control module to utilize the network:
receive a credential identifier from the access credential that corresponds to credentials of a guest that has been authorized to check-in to the facility, but that currently has no access permissions for assets within the facility;
compare the credential identifier to the locally-maintained list of the credential identifiers;
determine that the credential identifier matches at least one credential identifier in the list of credential identifiers; and
based on determining that the credential identifier matches at least one credential identifier in the list of credential identifiers, invoke the access control module to encode the access credential that presented the credential identifier to the provisioning module with access data that is useable by the access credential with other access control modules within the facility.

2. The access control module of claim 1, wherein upon completion of the single transaction, the access control module connect to the network, via the network interface, and reports to at least one of a centralized database and centralized access control logic a successful check-in transaction has occurred.

3. The access control module of claim 1, wherein the network interface to the network is a cellular telephony interface to a cellular telephony network.

4. The access control module of claim 1, wherein the network interface to the network is a wireless interface, comprising at least one of radio-frequency, magnetic, and light-based data transmission and reception, to a wireless network comprising at least reception and transmission equipment operable to transmit and receive data with the network interface.

5. The access control module of claim 1, wherein the logic unit is further configured to, upon successfully accessing the list of credential identifiers, disconnect from the network.

6. The access control module of claim 1, wherein the provisioning module invokes the local access control logic to encode the access credential with the access data after determining that the credential identifier matches at least one credential identifier in the list of credential identifiers and wherein the provisioning module is further configured to perform the following functions during the single transaction:
request the access credential to provide the access data back to the access control module;
receive the access data back from the access control module;
determine the access data matches data that was supposed to be written by the access control module; and
after determining that the credential identifier matches at least one credential identifier in the list of credential identifiers and after determining that the access data matches data that was supposed to be written by the access control module, remove the credential identifier from the list of credential identifiers; and
after completion of the single transaction, connect to the network and report a successful check-in to the centralized access control logic via the network.

7. The access control module of claim 6, wherein, prior to having the access credential presented to the access control module and after reservations have been confirmed for a user of the access credential, the centralized access control logic generates and sends at least one message to the access control module via the network causing the access control module to add the credential identifier to the list of credential identifiers and wherein after the centralized access control logic receives the report via the network of the successful check-in from the access control module, the centralized access control logic generates and sends messages to other access control modules within the facility thereby causing each of the other access control modules to update their locally-maintained lists of credential identifiers to reflect the successful check-in.

8. A method of operating a facility having a first location with a credential programming system located in proximity therewith and a plurality of access control modules located within the facility, a first of the access control modules being at a location remote from the first location and comprising local access control logic configured to make a determination to either permit or deny user access to an asset controlled by the first access control module and a provisioning module configured to perform check-in operations similar to the credential programming system, the method comprising:
connecting, using a network, the first access control module to a central access control logic to obtain a list of credential identifier and upon successfully obtaining the list of credential identifiers, terminating the connection between the first access control module and the central access control logic;
establishing an inductive Radio Frequency (RF) coupling between the first access control module and an access credential;
receiving, at the first access control module and via the RF coupling, a message from the access credential, the message including a credential identifier;
extracting, by the first access control module and while the RF coupling is still established between the first access control module and the access credential, the credential identifier from the message;
comparing, by the first access control module and while the RF coupling is still established between the first access control module and the access credential, the credential identifier with credential identifiers contained within the list of credential identifiers maintained at the first access control module, the list of credential identifiers comprising credential identifiers that correspond to credentials of a guest that is authorized to check-in to the facility at a location other than the first location;
determining, while the RF coupling is still established between the first access control module and the access credential, that the credential identifier matches at least one credential identifier in the list of credential identifiers; and based on determining that the credential identifier matches at least one credential identifier in the list of credential identifiers, encoding, by the first access control module and via the RF coupling, the access credential that presented the credential identifier to the first access control module with access data that enables the access credential to verify access permissions with the plurality of access control modules within the facility;

wherein the establishing, receiving, extracting, comparing, determining, and encoding steps are performed by the first access control module without requiring the first access control module to communicate with a central access control logic to obtain the credential identifier.

9. A method of managing a facility comprising a first asset and a second asset, the method comprising:

connecting a first access control module to a network to retrieve a list of credential identifiers, save the list of credential identifiers locally to the first access control module;

receiving, at the first access control module, a message from an access credential, the message including a credential identifier, wherein the first access control module comprises access control logic configured to make a determination to either permit or deny user access to the first asset;

extracting, by the first access control module, the credential identifier from the message;

comparing, by the first access control module, the credential identifier with credential identifiers contained within the list of credential identifiers maintained at the first access control module;

determining that the credential identifier matches at least one credential identifier in the list of credential identifiers maintained at the first access control module;

based on determining that the credential identifier matches at least one credential identifier in the list of identifiers maintained at the first access control module, permitting user access to the first asset even though the access credential does not have access data encoded thereon other than the credential identifier;

receiving, at a second access control module, a message from the access credential, the message including the credential identifier, wherein the second access control module comprises access control logic configured to make a determination to either permit or deny user access to the second asset and a provisioning module configured to perform check-in operations;

extracting, by the second access control module, the credential identifier from the message;

connecting the second access control module to the network to retrieve the list of credential identifiers, save the list of credential identifiers locally to the second access control module;

comparing, by the second access control module, the credential identifier with credential identifiers contained within a list of credential identifiers maintained for access by the second access control module, the list of credential identifiers maintained for access by the second access control module comprising credential identifiers that correspond to credentials of a guest is authorized to check-in to the facility and has not yet checked-in with a centralized programming system or any other provisioning module within the facility;

determining that the credential identifier matches at least one credential identifier in the list of credential identifiers maintained for access by the second access control module;

based on determining that the credential identifier matches at least one credential identifier in the list of identifiers maintained for access by the second access control module, encoding, by the second access control module, the access credential with access data that enables the access credential to verify access permissions with a plurality of access control modules within the facility, the plurality of access control modules including the first access control module and at least a third access control module.

* * * * *